(12) United States Patent
Pasumansky et al.

(10) Patent No.: US 7,694,278 B2
(45) Date of Patent: Apr. 6, 2010

(54) DATA CUBE SCRIPT DEVELOPMENT AND DEBUGGING SYSTEMS AND METHODOLOGIES

(75) Inventors: Mosha Pasumansky, Redmond, WA (US); Marius Dumitru, Issaquah, WA (US); Robert B. Zare, Issaquah, WA (US); Andriy Garbuzov, Redmond, WA (US); Richard R. Tkachuk, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1356 days.

(21) Appl. No.: 11/133,557

(22) Filed: May 20, 2005

(65) Prior Publication Data

US 2006/0020921 A1    Jan. 26, 2006

Related U.S. Application Data

(60) Provisional application No. 60/586,586, filed on Jul. 9, 2004.

(51) Int. Cl.
*G06F 9/44* (2006.01)

(52) U.S. Cl. .................. 717/125; 717/111; 717/115; 717/129

(58) Field of Classification Search ............... None
See application file for complete search history.

(56) References Cited

U.S. PATENT DOCUMENTS

| | | | |
|---|---|---|---|
| 5,293,615 A | 3/1994 | Amada |
| 5,767,854 A | 6/1998 | Anwar |
| 5,855,018 A | 12/1998 | Chor et al. |
| 5,878,423 A | 3/1999 | Anderson et al. |
| 5,918,232 A | 6/1999 | Pouschine |
| 5,920,867 A | 7/1999 | Van Huben |
| 5,930,762 A | 7/1999 | Masch |
| 5,969,974 A | 10/1999 | Vandenbelt et al. |
| 5,970,482 A | 10/1999 | Pham et al. |
| 5,970,493 A | 10/1999 | Shoup et al. |
| 5,974,572 A | 10/1999 | Weinberg et al. |
| 6,006,223 A | 12/1999 | Agrawal et al. |
| 6,044,219 A | 3/2000 | Lips |
| 6,078,918 A | 6/2000 | Allen et al. |
| 6,108,640 A | 8/2000 | Slotznick |
| 6,108,647 A | 8/2000 | Poosala et al. |
| 6,122,636 A | 9/2000 | Malloy |
| 6,330,564 B1 | 12/2001 | Hellerstien |

(Continued)

OTHER PUBLICATIONS

Blakeley. "Data access for the Masses Through OLE DB", SIGMOD '96, ACM, Jun. 1996, p. 161-172.

(Continued)

*Primary Examiner*—Tuan Q Dam
*Assistant Examiner*—Hanh T Bui
(74) *Attorney, Agent, or Firm*—Workman Nydegger

(57) ABSTRACT

The subject invention pertains to systems and methods that facilitate development and debugging of calculations in a multidimensional data environment or model. Data cube calculation scripts, including those provided in MDX (Multidimensional Expressions), can be executed or applied incrementally. Breakpoints can be set with respect to a calculation script and the cube state can be viewed and queried via a user interface. Users are enabled by the subject systems and methods to step through calculation scripts, identify the effects on a cube, and alter the script if the desired results failed to occur. In addition to debugging, the systems and methods can be employed for initial development of scripts.

17 Claims, 15 Drawing Sheets

U.S. PATENT DOCUMENTS

| | | | |
|---|---|---|---|
| 6,430,545 B1 | 8/2002 | Honarvar et al. | |
| 6,470,352 B2 | 10/2002 | Yaginuma | |
| 6,477,536 B1 * | 11/2002 | Pasumansky et al. | 707/102 |
| 6,477,538 B2 | 11/2002 | Yaginuma et al. | |
| 6,549,907 B1 | 4/2003 | Fayyad | |
| 6,606,621 B2 | 8/2003 | Hopeman | |
| 6,651,055 B1 | 11/2003 | Kilmer et al. | |
| 6,658,645 B1 | 12/2003 | Akuta | |
| 6,662,195 B1 | 12/2003 | Langseth et al. | |
| 6,671,875 B1 * | 12/2003 | Lindsey et al. | 717/129 |
| 6,675,356 B1 | 1/2004 | Adler et al. | |
| 6,694,322 B2 | 2/2004 | Warren | |
| 6,721,715 B2 | 4/2004 | Nemzow | |
| 6,853,994 B1 | 2/2005 | Gupta | |
| 6,898,603 B1 | 5/2005 | Petculescu | |
| 6,973,491 B1 | 12/2005 | Staveley et al. | |
| 6,990,480 B1 | 1/2006 | Burt | |
| 7,007,020 B1 | 2/2006 | Chen | |
| 7,062,479 B2 | 6/2006 | Edmunds | |
| 7,062,757 B2 | 6/2006 | Honarvar et al. | |
| 7,076,475 B2 | 7/2006 | Honarvar | |
| 7,089,266 B2 | 8/2006 | Stolte | |
| 7,181,438 B1 | 2/2007 | Szabo | |
| 7,181,440 B2 | 2/2007 | Cras et al. | |
| 7,222,130 B1 | 5/2007 | Cras et al. | |
| 7,383,234 B2 | 6/2008 | Lyer | |
| 7,451,137 B2 | 11/2008 | Crivat | |
| 7,490,106 B2 | 2/2009 | Dumitru | |
| 7,533,348 B2 | 5/2009 | D'Hers | |
| 2001/0011241 A1 | 8/2001 | Nemzow | |
| 2001/0054034 A1 | 12/2001 | Arning et al. | |
| 2002/0032609 A1 | 3/2002 | Wilkman | |
| 2002/0103807 A1 | 8/2002 | Yamashita | |
| 2002/0111934 A1 | 8/2002 | Narayan | |
| 2003/0023463 A1 | 1/2003 | Dombroski et al. | |
| 2003/0046303 A1 | 3/2003 | Chen et al. | |
| 2003/0105658 A1 | 6/2003 | Chen | |
| 2003/0115194 A1 | 6/2003 | Pitts | |
| 2003/0217354 A1 * | 11/2003 | Bates et al. | 717/129 |
| 2004/0003132 A1 | 1/2004 | Stanley | |
| 2004/0034616 A1 | 2/2004 | Witkowski | |
| 2004/0064456 A1 | 4/2004 | Fong | |
| 2004/0103092 A1 | 5/2004 | Tuzhilin | |
| 2004/0111428 A1 | 6/2004 | Rajan et al. | |
| 2004/0139061 A1 | 7/2004 | Colossi | |
| 2004/0188998 A1 | 9/2004 | Henthorn | |
| 2004/0236767 A1 | 11/2004 | Soylemez | |
| 2005/0165733 A1 | 7/2005 | Strovink | |
| 2005/0222972 A1 | 10/2005 | Mishra et al. | |
| 2005/0222992 A1 | 10/2005 | Kondo | |
| 2006/0010058 A1 | 1/2006 | D'Hers | |
| 2006/0010157 A1 | 1/2006 | Dumitrascu et al. | |
| 2006/0020608 A1 | 1/2006 | D'Hers | |
| 2007/0118501 A1 | 5/2007 | Yan | |

OTHER PUBLICATIONS

Microsoft OLE DB for OLAP: Programmer's Reference, Microsoft Corporation, Dec. 1998.
OLE DB for Data Mining Specification Version 1.0. Microsoft Corporation, Jul. 2000. 133 pgs.
OA Dated Aug. 29, 2008, for U.S. Appl. No. 11/054,302, 31 pages.
Draper, et al., Xquery 1.0 and Xpath 2.0 Formal Semantics, W3C Working Draft, Apr. 4, 2005, pp. 1-300.
Walmsley, Priscilla, Chapter 4, Navigating Input Documents Using Paths, Xquery, O'Reilly Media Inc., 2007, pp. 39-56.
Office Action dated Jun. 19, 2007 cited in U.S. Appl. No. 11/054,803.
Office Action dated Oct. 23, 2007 cited in U.S. Appl. No. 11/054,803.
Office Action dated Dec. 10, 2007 cited in U.S. Appl. No. 11/054,803.
Office Action dated Jun. 30, 2008 cited in U.S. Appl. No. 11/054,803.
Office Action dated Mar. 9, 2009 cited in U.S. Appl. No. 11/054,803.
Office Action dated Jun. 14, 2007 cited in U.S. Appl. No. 11/131,631.
Office Action dated Oct. 31, 2007 cited in U.S. Appl. No. 11/131,631.
Office Action dated Dec. 10, 2007 cited in U.S. Appl. No. 11/131,631.
Office Action dated Jun. 11, 2008 cited in U.S. Appl. No. 11/131,631.
Office Action dated Dec. 29, 2008 cited in U.S. Appl. No. 11/131,631.
Office Action dated Jul. 23, 2009 cited in U.S. Appl. No. 11/131,631.
Office Action dated Jul. 27, 2007 cited in U.S. Appl. No. 11/054,302.
Office Action dated Jan. 9, 2008 cited in U.S. Appl. No. 11/054,302.
Notice of Allowance dated Feb. 19, 2009 cited in U.S. Appl. No. 11/054,302.

* cited by examiner

DATA CUBE SCRIPT DEVELOPMENT AND DEBUGGING SYSTEMS AND METHODOLOGIES

CROSS-REFERENCE TO RELATED APPLICATIONS

This application claims the benefit of U.S. Provisional Application Ser. No. 60/586,586, filed Jul. 9, 2004, entitled SYSTEMS AND METHODS OF CUSTOMIZING DATABASES. The entirety this application is incorporated herein by reference.

TECHNICAL FIELD

The subject invention relates generally to computers and more particularly toward development and debugging systems and methodologies and multidimensional data cubes.

BACKGROUND

Data warehousing and online analytical processing (OLAP) are widespread technologies employed to support business decisions and data analysis. A data warehouse is a nonvolatile repository for an enormous volume of organizational or enterprise information (e.g., 100 MB-TB). These data warehouses are populated at regular intervals with data from one or more heterogeneous data sources, for example from multiple transactional systems. This aggregation of data provides a consolidated view of an organization from which valuable information can be derived. Though the sheer volume can be overwhelming, the organization of data can help ensure timely retrieval of useful information.

Data warehouse data is often stored in accordance with a multidimensional database model. Conceptually in multidimensional database systems, data is represented as cubes with a plurality of dimensions and measures, rather than relational tables with rows and columns. A cube includes groups of data such as one or more dimensions and measures. A dimension describes an entity by which a user wants to analyze their data. A dimension is a collection of attributes that source the dimension's hierarchies and member properties. Accordingly, data can be viewed at different levels of detail. Measures represent real values, which are to be analyzed.

There are at least two primary reasons for the existence of multidimensional databases. First, the multidimensional model is optimized to deal with large amounts of data. In other words, it has a fast query response over large data volumes. Furthermore, the multidimensional model is business user friendly. This enables users execute complex queries on a data cube. OLAP is almost synonymous with multidimensional databases.

OLAP is a key element in a data warehouse system. OLAP describes a category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things. There are two basic types of OLAP architectures MOLAP and ROLAP. MOLAP (Multidimensional OLAP) utilizes a true multidimensional database to store data. ROLAP (Relational OLAP) utilizes a relational database to store data but is mapped so that an OLAP tool sees the data as multidimensional. HOLAP (Hybrid OLAP) is an amalgam of both MOLAP and ROLAP.

Data cube cells (and similarly members and the like) can include either fact data or functions (also referred to as calculations, expressions . . . ). Cells that include functions are called calculated cells. The value of these cells is defined by an expression in terms of one or more other cells and mathematical operations. The actual values of such cells are not known until runtime when the expressions or calculations are resolved. The formulas or expressions are defined and assigned to cells utilizing a calculation script, for example specified in a multidimensional language such as MDX (MultiDimensional eXpressions)

Even in simple OLAP applications, there can be several intersections of calculations in the multidimensional space. When these intersections occur, it is generally not clear which formula wins; such is the nature of multidimensionality. Heretofore, the process of building and debugging calculations scripts has been a difficult, time-consuming process that even the most advanced users consider to be tedious. Accordingly, there is a need in the art for novel systems and methods to facilitate development and debugging of cube calculations scripts, among other things.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns novel development and debugging systems and methods for multidimensional data cubes. More particularly, the systems and methods facilitate development and debugging of calculation scripts. Calculations scripts can specify formulas or expressions for cube cells, members, measures and the like. Development and debugging of calculations in a multidimensional model, especially when complex, is quite difficult and convoluted. The subject invention provides systems and methods to reduce the burden with respect to these processes.

In accordance with an aspect of the invention, a development and debugging system is disclosed that includes an interface component and a debug engine. The interface component, such as a graphical user interface, receives and provides data to and from users. The debug engine obtains data and/or instructions from the interface component and facilitates execution of calculation scripts identified via the interface component. The debug engine can also retrieve data from a cube and provide it back to the interface component. This enables users such as database administrators to analyze the cube state generated as a result of application of particular calculations. A user can then alter a calculation script and reapply the altered calculations in an iterative process to develop or debug calculation scripts including but not limited to MDX scripts.

Development and debugging methodologies are also disclosed in accordance with an aspect of the invention. For instance, a method of calculation script development is disclosed that clears calculations on a cube within a session, executes a calculation script and returns cube state data to a user interface. The method further includes receiving a clear calculation command to initiate clearing of calculations, among other things.

In accordance with an aspect of the invention, cube calculations can be cleared or rolled back to facilitate script development and debugging. In other words, formula assignments can be stripped way from a cube returning the cube to its initial or pre-script calculation state In this manner, the impact of calculations and alterations thereof can be evaluated by a debugging entity independent of the cube's previous state. Rolling back can be initiated employing an instruction including but not limited to "Clear Calculations" in MDX. A server, database management system, query execution engine, cube management system of the like can receive and execute such a command thereby removing the calculations on a particular cube.

In accordance with another aspect of the invention, the debugging and development of a calculation script can occur within the scope of a user session. Through the isolation of a session, multiple users can interact with the same cube that is simultaneously being debugged or produced. Clearing all the calculations can thus be limited to the scope of the session in which it is requested. Other users can still interact and query the cube without any disruption or change to the original model.

According to still another aspect of the invention, the calculation script can be executed without the need to rebuild and redeploy the script after alterations are made. Thus, modification can be made on the fly during a development or debug process such that a change can be made, executed, and results displayed.

In accordance with yet another aspect of the invention, development and debugging is supported utilizing a plurality of user credentials or security roles. In this manner, a user can change their user or security context on the fly during a development or debugging process. This is advantageous in detecting breaks in calculations in a number or different security contexts.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component," "system," "engine" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Figure 1:
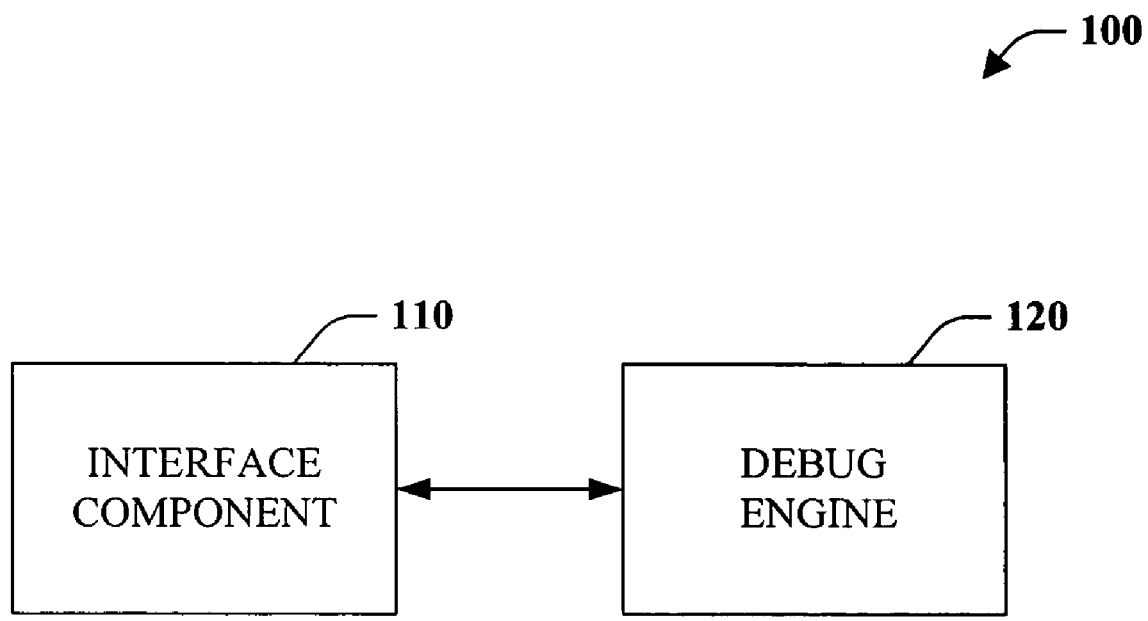
FIG. 1 is a block diagram of a multidimensional data structure debugging system in accordance with an aspect of the subject invention.

Turning initially to FIG. 1, a multidimensional data structure debugging system 100 is illustrated in accordance with an aspect of the subject invention. System 100 includes an interface component 110 and a debug engine 120. Interface component 110 facilitates user interaction with the debugging system. The interface component 110 can receive input and provide data to a user. This can be accomplished via text, graphics, sound, and the like. Such interface objects can be organized in a fashion that makes user interaction therewith easy and intuitive. Users can input or specify a script or a series of commands and/or statements for application against a multidimensional database structure such as a cube. In accordance, with an aspect of the invention the script can be specified utilizing multidimensional expressions (MDX). Such a script can be employed to populate a cube or cells thereof with calculations. In other words, the script can assign expressions to cells that can be evaluated later upon query, for instance. Interface component 110 is communicatively coupled to the debug engine 120. Debug engine 120 can execute or apply the script identified by the interface component 110 and return result data back to the interface component 110. In particular, a calculation script can be executed with respect to a data cube and the cube state can be returned to the interface component 110. If the cube state is not what is desired, a user can modify the script utilizing interface component 110 and then reapply the script to the cube. According to an aspect of the subject invention, the debug engine does not need to be rebuilt and redeployed in response to the new script. The script can be treated as a loop thus eliminating these time consuming processes. Furthermore and in accordance with another aspect of the subject invention, the debug system 100 does not affect the ability of others to query a data cube being debugged. Debug operations and executions for a given cube are within the scope of an individual user session. Still further yet, the debug system comprising the interface component 110 and debug engine 120 can be employed not only to debug an existing script but also to facilitate generation of a script.

Figure 2:
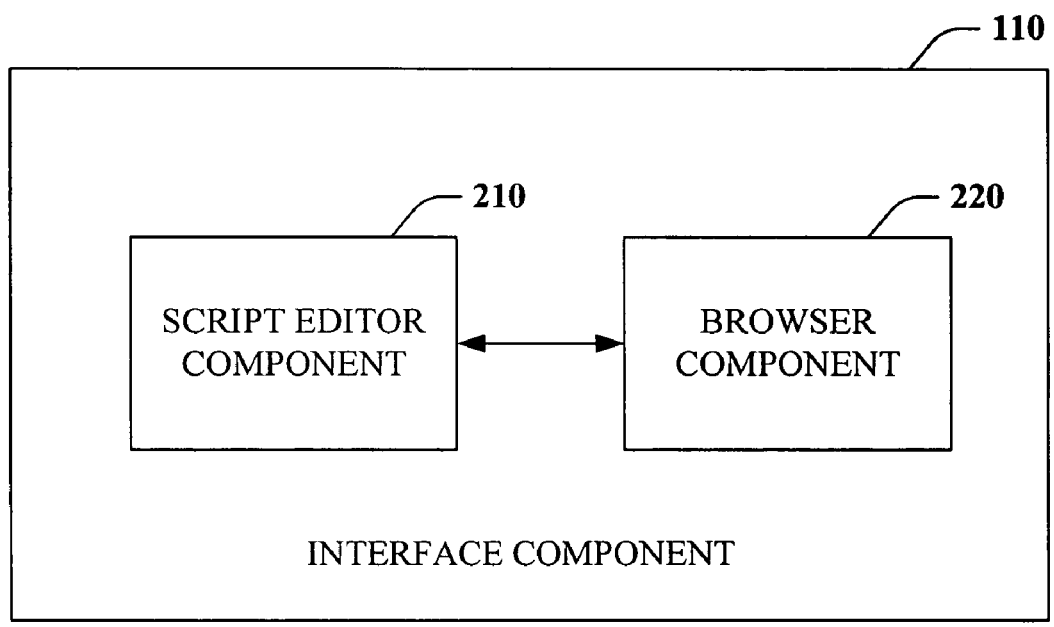
FIG. 2 is a block diagram of an interface component in accordance with an aspect of the subject invention.

FIG. 2 depicts an interface component 110 in accordance with an aspect of the subject invention. As illustrated, interface component 110 can include a script editor component 210 and a browser component 220. The script editor component 210 is a mechanism the provides for viewing as well as editing text scripts including but not limited to MDX calculation scripts. The script editor 210 can be a screen-oriented editor wherein a cursor can be moved to a location on within the displayed editor to designate a point for script alteration, addition, and/or removal. Additionally, many other subcomponents, mechanisms, or methods can be included or associated with script editor component 210 including but not limited to intelligent assistance. For example, the script editor component 510 can provide automatic completion of phrases or script constructs based on a partial specification and/or context to facilitate proper entry of script syntax and ease of use.

Figure 3:
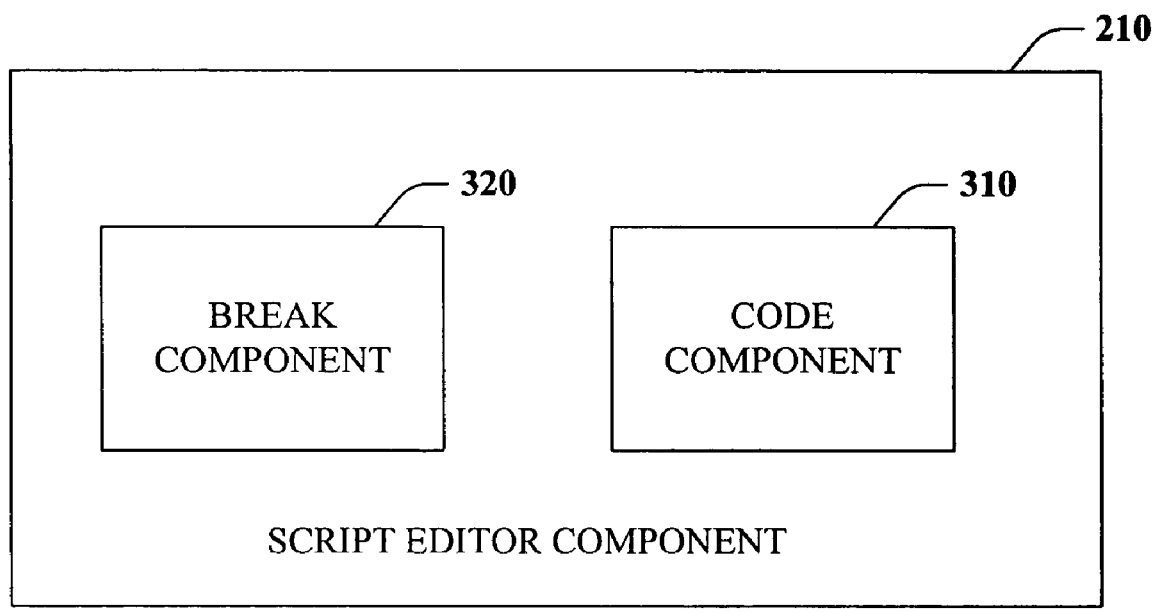
FIG. 3 is a block diagram of a script editor component in accordance with an aspect of the subject invention.

Turning briefly to FIG. 3, a script editor component 210 is illustrated in further detail in accordance with an aspect of the subject invention. In particular, the script editor component 210 can include a code component 310 and break component 320. Code component 310 can display a script and receive alterations thereto including additions, deletions as well as modifications. Furthermore, the code component 310 can provide additional functionality such as intelligent assistance. Break component 320 is operative to set script breakpoints as specified by a user. A break point identifies a particular portion or point of code in which execution is to stop in all instances or in accordance with a set of criteria. The debug engine 120 (FIG. 1) can execute up to the set breakpoint to allow analysis of the cube state at that point. Multiple breakpoints can be employed utilizing break component 320 to enable analysis of state at different points. Additionally or alternatively, the debug engine 120 can be forced to step through script instructions thereby allowing state to be analyzed after every instruction.

Figure 4:
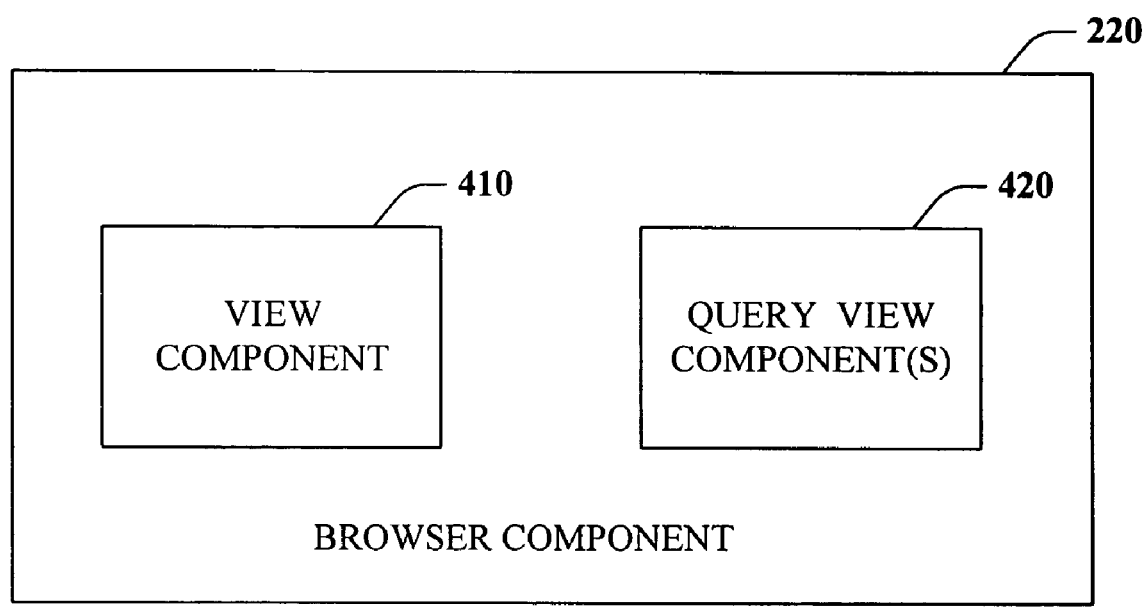
FIG. 4 is a block diagram of a browser component in accordance with an aspect of the subject invention.

Returning to FIG. 2, browser component 220 provides a mechanism to present state data received from the debug engine 120, among other things. Browser component 220 is related to script editor 210 as the cube state presented by browser component 220 results from the execution of a particular script loaded and/or written using script editor component 210. Turning briefly to FIG. 4, a browser component 220 is illustrated in further detail in accordance with an aspect of the subject invention. More specifically, browser component can include a view component 410 and a query view component 420. The view component 410 is a mechanism for presenting cube state data. For example, the browser component 220 can format received data into a graphical representation such as a table to aid in analyzing the state. The table data can be refreshed with every statement or command executed. Furthermore, the view component can highlight cells or data that has changed since the last statement. In this manner, a debugger could step through a script and easily identify the cells that changed as a result of application of calculation. View component 410 can present a default view of a cube state. Browser component 220 can also include a query view component 420 for specification and presentation of custom data views. Query view component 420 receives one or more statements or queries that produce particular a result set. By virtue of this component, a user can specify particular queries to determine how a script affects a particular result set. The specified queries can be executed on the backend with the assistance of the debug engine and/or a query execution engine. The results can then be displayed. Additionally, the data changed as a result of application of a calculation or script command can be highlighted to facilitate debugging.

Figure 5:
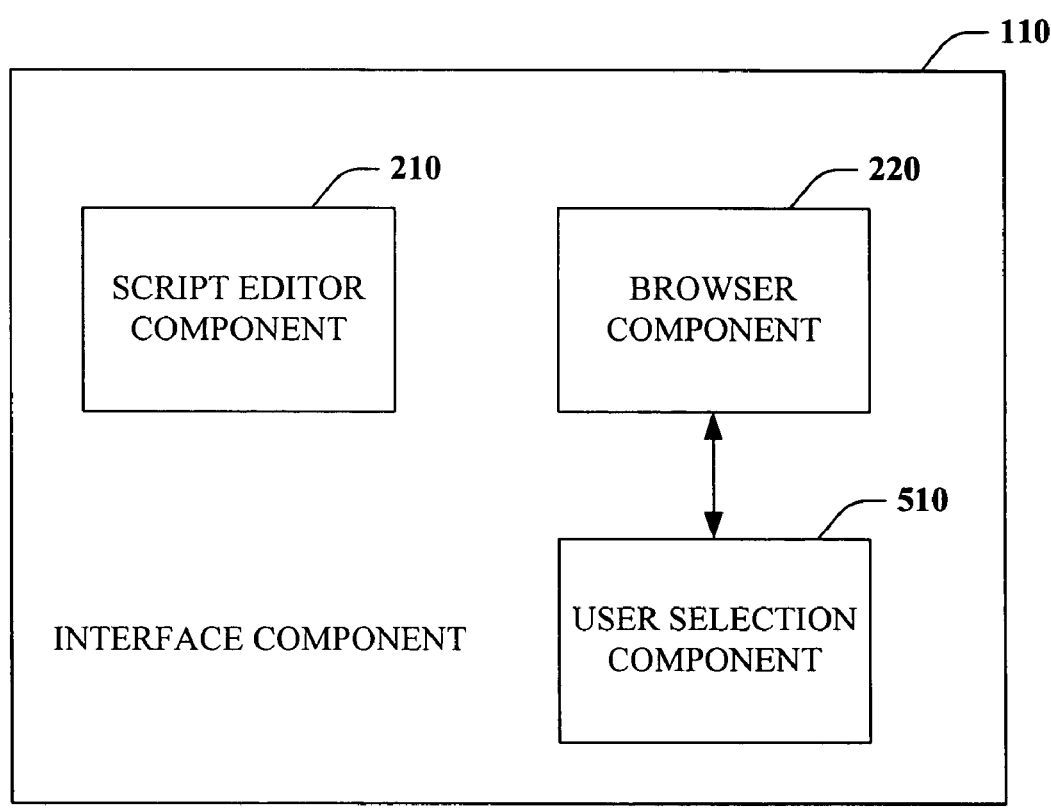
FIG. 5 is a block diagram of an interface component in accordance with an aspect of the subject invention.

FIG. 5 illustrates an interface component 110 in accordance with an aspect of the subject invention. Interface component 110 includes a script editor component 210, a browser component 220, and a user selection component 510. The script editor component 210 provides a mechanism for presenting script text to a user, receiving amendments thereto, and/or creating a script. The script editor can also include a break component for specifying script breakpoints to facilitate analysis of script calculations. Browser component 220 presents state data generated as a result of execution of the script identified in the script editor. The browser component 220 can include a default state view as well as customized views based on specified queries. User selection component 510 can interact with and influence the data presented thereby. User selection component 510 can receive or provide for selection a user, user credentials, or security permission role for which the state should be viewed. As an administrator or cube creator access is to data is not limited. Specified script calculations are executed against all data. However, there are various classes of users for security purposes, which can only see a subset of the data. For example, some users may not have permission to view associated cell data for various parts of a cube and other users may not be allowed to view certain members. Thus, it is quite possible that calculations for particular users may be broken or erroneous. User selection component 510 enables a user to select or impersonate a user or security role to facilitate debugging as such a user or in such a role with limited access to cube data. The debug engine 120 (FIG. 1) can generate cube state in accordance with particular user credentials. Thus, browser component 120 would display the cube state for a user identified via user selection component 510. It should be appreciated that the subject invention supports changing users or roles on the fly during a debugging process without rebuilding, recompiling, or restarting a debugging session. Thus, a cube developer could debug a script as an administrator, and then select a particular user, credential or role to debug in that capacity.

Figure 6:
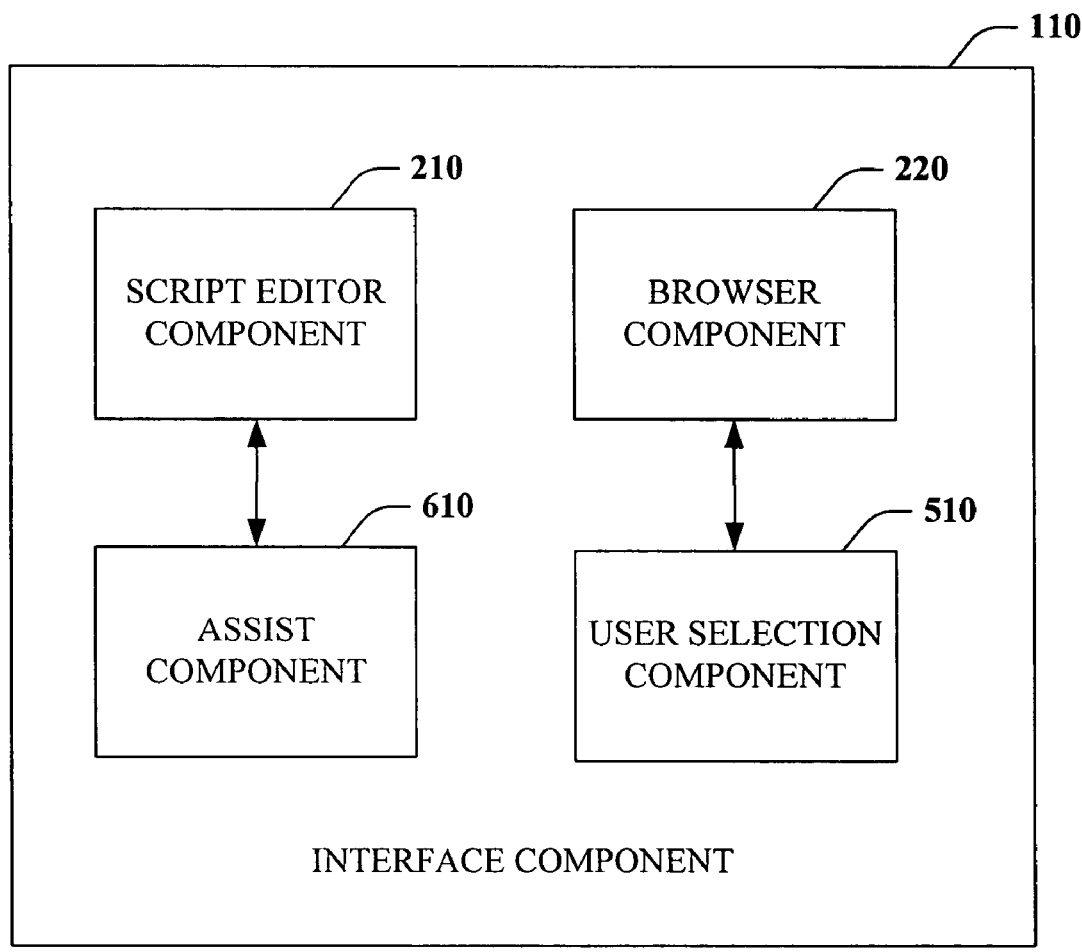
FIG. 6 is a block diagram of an interface component in accordance with an aspect of the subject invention.

FIG. 6 depicts an interface component 110 in accordance with an aspect of the subject invention. Interface component 110 includes a script editor component 210, a browser component 220, a user selection component 510, and an assist component 610. As previously described, a script editor component 210 provides a mechanism for specifying, editing, and otherwise manipulating calculation script for multidimensional cubes, for instance. Further, the script editor component 210 can provide a mechanism to specify breakpoints within the script to facilitate debugging. The browser component 220 is mechanism for presenting cube state data. Such data can be provided in a default format. Alternatively, queries can be received and executed to enable customized data views or states to be scrutinized. The user selection component 510 provides for a specification of a user or user credentials for which the script is to be executed. This can affect the state of the cube presented by the browser component 220 and enable a user to debug as different users with differing security credentials. Assist component 610 provides mechanisms to facilitate specification and debugging of a script in script editor component 210. For example, assist component 610 can provide information concerning the cube being debugged as well as utilities for specifying or altering scripts that operate thereon.

Figure 7:
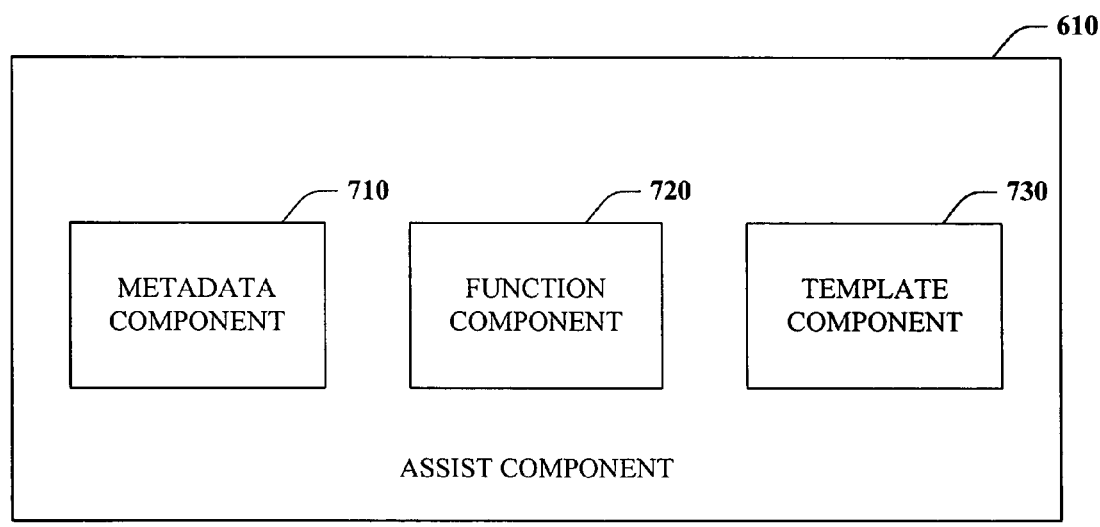
FIG. 7 is a block diagram of an assist component in accordance with an aspect of the subject invention.

Turning briefly to FIG. 7, an assist component 610 is illustrated in further detail in accordance with an aspect of the subject invention. In particular, assist component 610 can include a metadata component 710, a function component 720, and a template component 730. The metadata component 710 can present, display, or otherwise provide information regarding cube metadata. Upon opening or specifying a script, metadata component 710 can retrieve and present cube metadata to a user. This can help a user in both specification and debugging of a script on a cube. Assist component 610 can also include a function component 720. Function component 720 can provide popular or useful functions that a user may want to specify in a calculation script. Function component 720 can thus provide functions for selection and inclusion in the calculations script. For example, a user may cut and paste or drag a function into the script editor portion of the interface. Additionally or alternatively, the function component 720 can display a list of functions currently specified on the cube. Upon select of such a function, the location of such a function can be identified in the script, for example via highlighting. Furthermore, the assist component can include a template component 730. The template component 730 can provide or otherwise present one or more templates, structures or patterns that can be employed to assist a user in creation of a calculations script.

Figure 8:
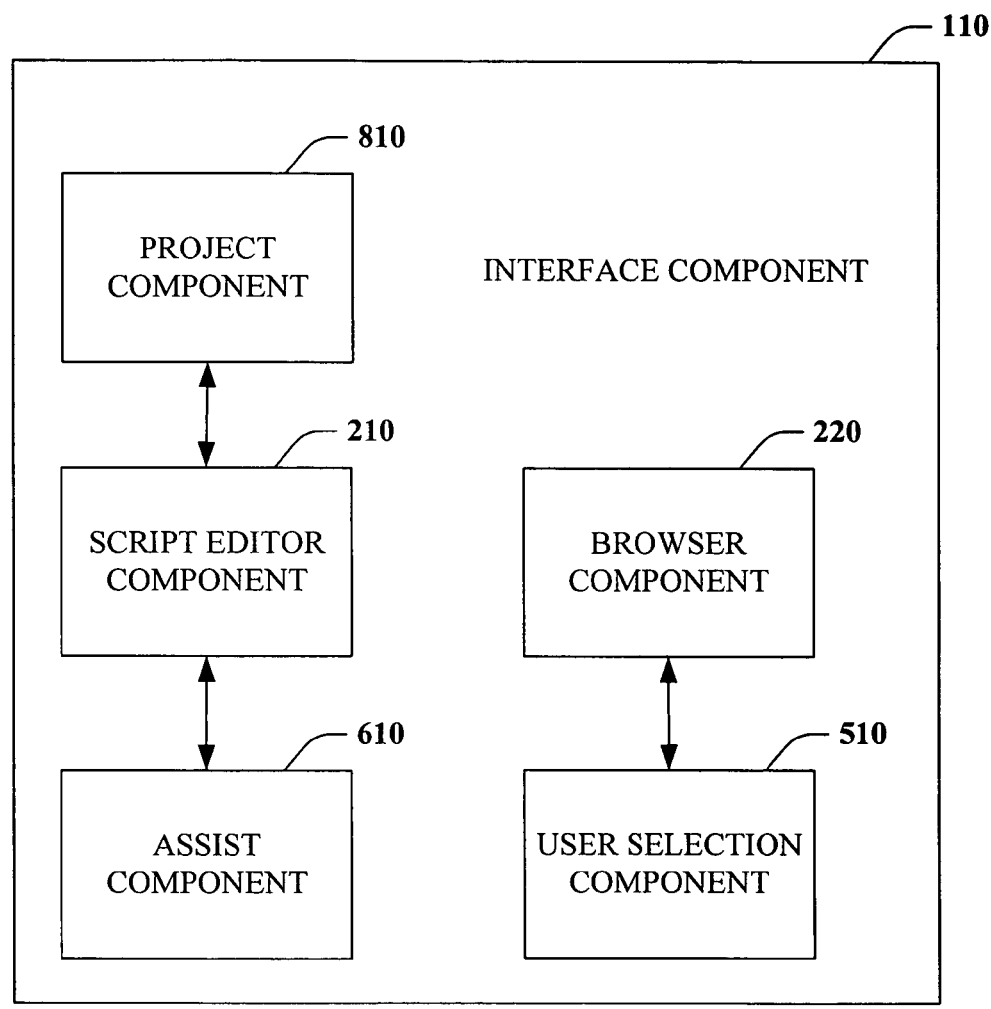
FIG. 8 is a block diagram of an interface component in accordance with an aspect of the subject invention.

FIG. 8 illustrates an interface component 110 in accordance with an aspect of the subject invention. Interface component 110 includes a script editor component 210, a browser component 220, a user selection component 510, an assist component 610, and a project component 810. As discussed supra, the script editor component 210 provides a mechanism for specification, editing, and debugging a script including but not limited to an MDX calculation script. Browser component 220 presents a cube state data that is produces as a result of the script in one or more formats. The user selection component 510 provides a mechanism for identification or selection of a user or user credential, which a user wishes to impersonate to facilitate debugging. The assist component 610 provides a plurality of utilities that a user can employ to facilitate one or more of debugging, script specification, and script alteration. Project component 810 can provide a user with further assistance concerning management of a project including one or more data sources, views, cubes, dimensions, mining structures, roles, and the like. The project component 810 can provide an organized view of projects, files, structures, and the like. This enables a user to easily open, close, add, remove, or otherwise manipulate or manage project items.

Figure 9:
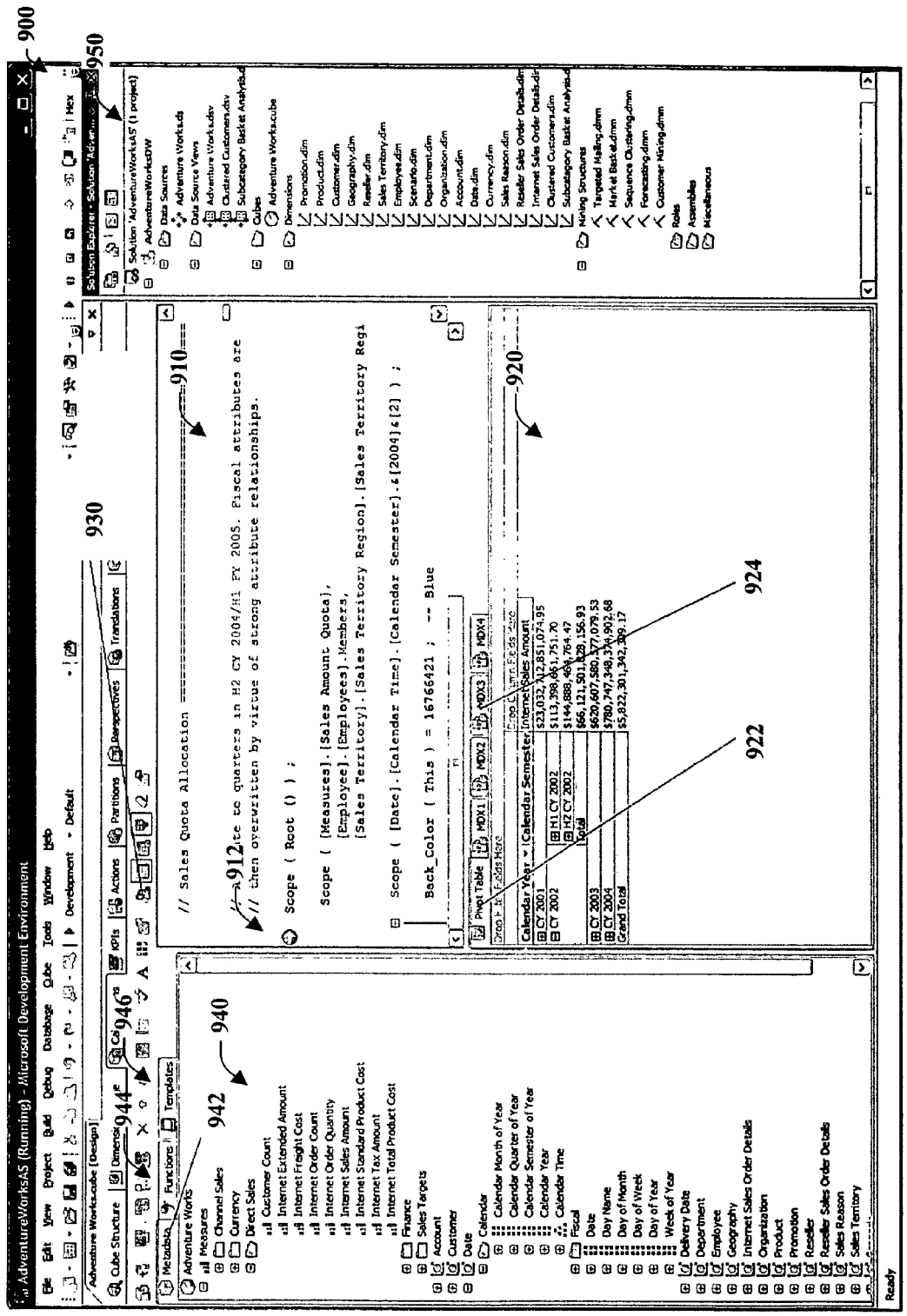
FIG. 9 is an exemplary graphical user interface in accordance with an aspect of the subject invention.

FIG. 9 provides an exemplary graphical user interface 900 in accordance with an aspect of the subject invention. A script editor window 910 is shown. The window or pane 910 includes a calculation script code that can be displayed and edited therein. For example, a user can move a curser into the window to select a position to insert additional code, or highlight existing code to overwrite, move, or delete. The editor window 910 includes a break point indicator 912 within a margin indicator bar to the left in the editor window. The breakpoint indicator 912 can be represented as an arrow or alternatively as one or more colored circles or dots that identify a point in code up to which execution will proceed. This is beneficial in debugging at least because it enables isolation of particular statements or script instructions. A browser window 920 is also included in interface 900. The browser window 920 can display data cube states. In this instance, the browser window 920 includes plurality of tabs 922 and 924. Tab 922, which is the active or displayed tab, corresponds to a default pivot table view. This view can be refreshed with every new command that is executed. Tabs 924 correspond to user specified queries. Such queries can be specified to scrutinize a particular result set. As shown, there are four user query tabs 924. Upon activation or selection of a user query tab 924, a result set can be displayed in browser window 920. To ensure efficient performance, only the active user query can be refreshed, if there is one. Icon 930 in the interface toolbar can act as a button for selecting or changing user credentials. For example, one could either impersonate a named use or the permissions of a security role, which may include many users. Interface 900 can also include three tabs for display of information in window or pane 940. Tab 942 corresponds to cube metadata. This can be employed for instance to facilitate browsing of server side object metadata. Tab 944, when activated, can present functions in window 940 that can be selected for use in development of a script. Additionally or alternatively, the functions presently specified by the script can be displayed in this window. Selection of such a function could identify its location in the script in window 910 via highlighting, for example. Similarly, tab 946, when activated, can provide templates for use in design and debugging of the script in script editor window 910. Furthermore, a project window 950 is provided in interface 900. The project window 950 presents an organized tree of data, files, structures, views, dimensions and the like that are employed for a given project. This enables project management. For example, a view can be selected and deleted. Alternatively, a new view can be added to the project in which case it would be identified in the project management window 950.

Figure 10:
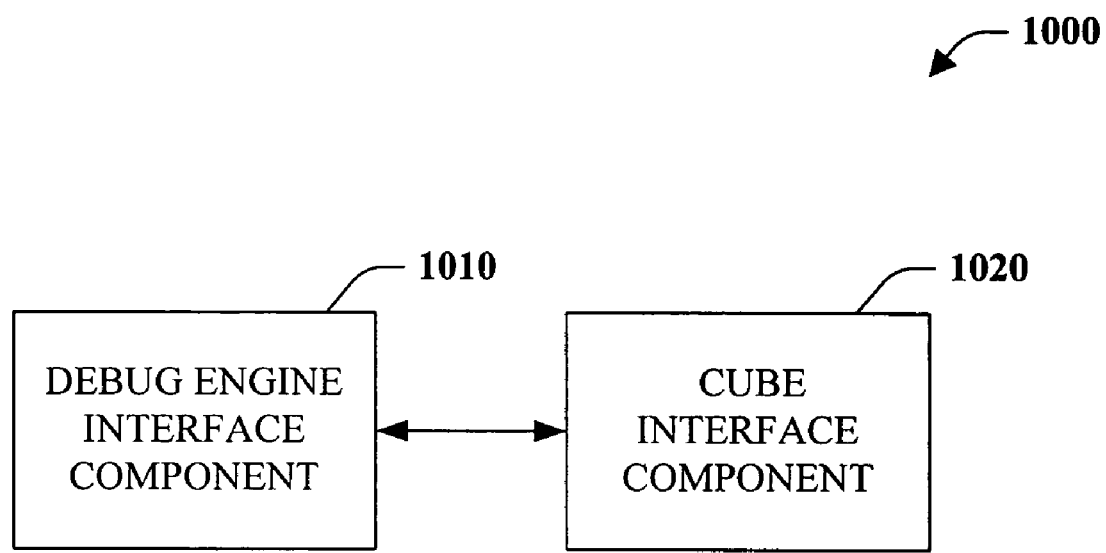
FIG. 10 is a block diagram of an interface system in accordance with an aspect of the subject invention.

FIG. 10 illustrates an interface system 1000 in accordance with an aspect of the subject invention. Typically but not always, a cube is stored on a server, while debugging system or application is executed elsewhere. Accordingly, interface system 1000 provides a mechanism to facilitate communication there between. Interface system 1000 includes a debug engine interface component 1010 and a cube interface component 1020. The debug engine interface component 1010 receives data from and outputs data to a debug engine. A debug engine, such as debug engine 120 of FIG. 1, is responsible for applying calculation scripts to cubes and retrieving a state upon execution or application thereof. The debug engine provides a mechanism to facilitate debugging of cube calculation scripts. Debug engine interface component 1010 is communicatively coupled to cube interface component 1020. Cube interface component 1020 receives statement such as MDX statements and optionally returns data to debug engine interface component 1010. According to an aspect of the subject invention, the debug engine interface component 1010 can receive a MDX statement "Clear Calculations" or the like and can pass this statement to the cube interface component 1020. Upon receipt of this statement, the calculations on the cube for a user session can be cleared. In essence, the assignments placed on the cube are stripped away returning the cube to its initial state. As will be described infra, this can allow calculations to be reapplied incrementally and allows a user to view the impact or influence of each applied calculation. In accordance with another aspect of the invention, interface system 1000 can be employed to facilitate population of data views. For example, debug engine interface component 1010 can receive default or custom queries specified by a user from the debug engine and transmit such query to the cube interface component. The cube interface component 1020 can then return the result set that satisfies the query to the debug engine interface component 1010. A graphical user interface or a portion thereof can subsequently be populated with the result set, for example by way of a debug engine.

The aforementioned systems have been described with respect to the interaction between several components. Furthermore, for purposes of clarity and simplicity, a number of systems were provided and described to emphasize an aspect of the subject invention. It should be appreciated that such systems can include those components specified therein, some of the specified components, and/or additional components specified in other systems. For example, a debug system can include an interface component that includes one or more subcomponents such as a script editor component 210, a browser component 220, a user selection component 510, an assist component 610, a project component 618, or any combination thereof. The subcomponents can also include any combination of subcomponents as well. Additionally, it should be noted that one or more components may be combined into a single component providing aggregate functionality or divided into several subcomponents. The components may also interact with or be integrated with one or more other components or systems not specifically described herein but known by those of skill in the art. By way of example and not limitation, aspects of the subject invention pertaining to development and debugging of data cube calculation scripts can be integrated into a more comprehensive integrated development environment (IDE) or system (also known as integrated design environment or integrated debugging environment). Such IDEs can support the development and debugging of one or more programming languages or scripts.

Furthermore, as will be appreciated by artisans of ordinary skill in this field, various portions of the disclosed systems above and methods below may include or consist of artificial intelligence or knowledge based components, sub-components, processes, means, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as well as efficient.

Figure 11:
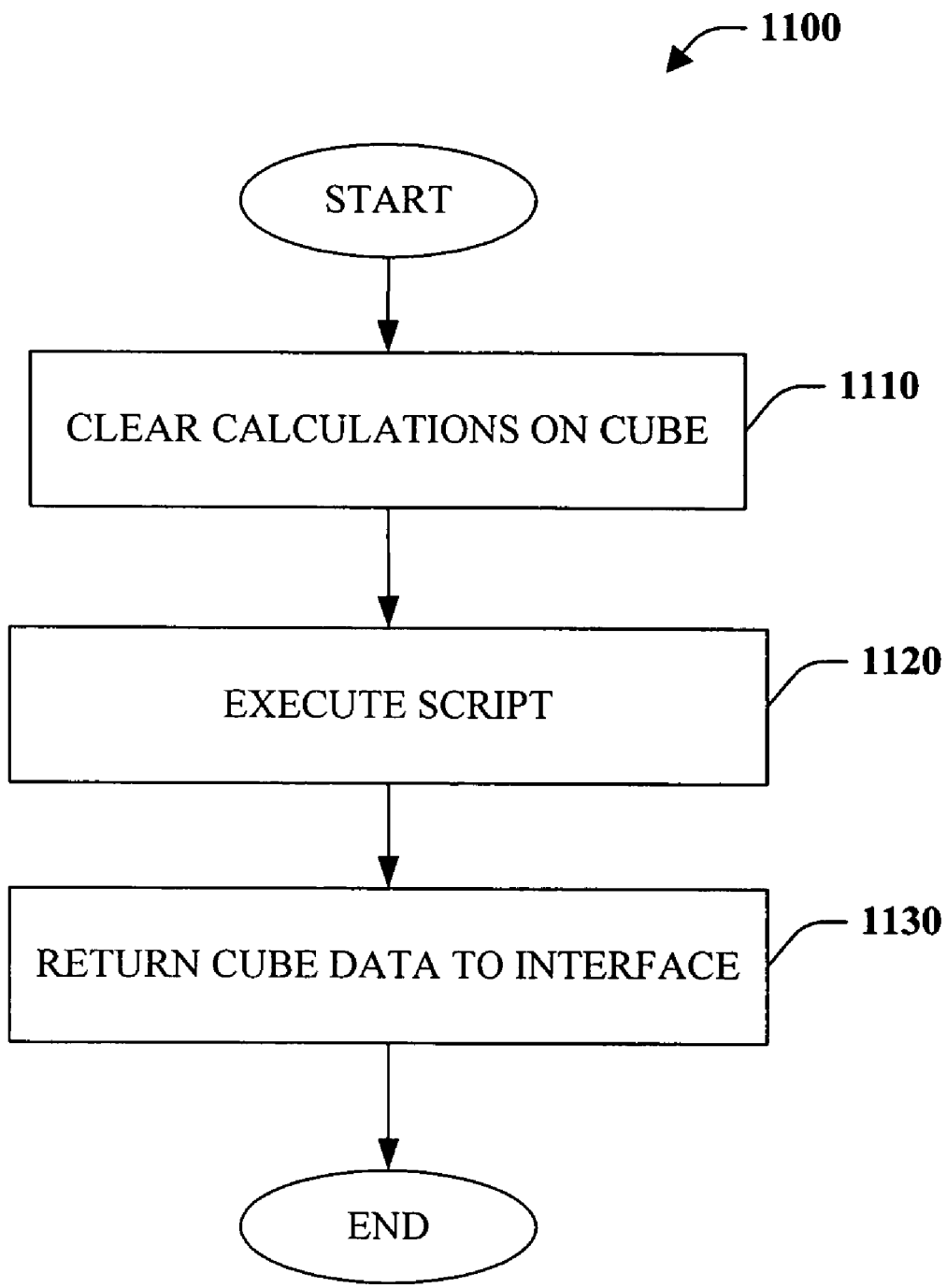
FIG. 11 is a flow chart diagram of a method of script development in accordance with an aspect of the subject invention.
Figure 12:
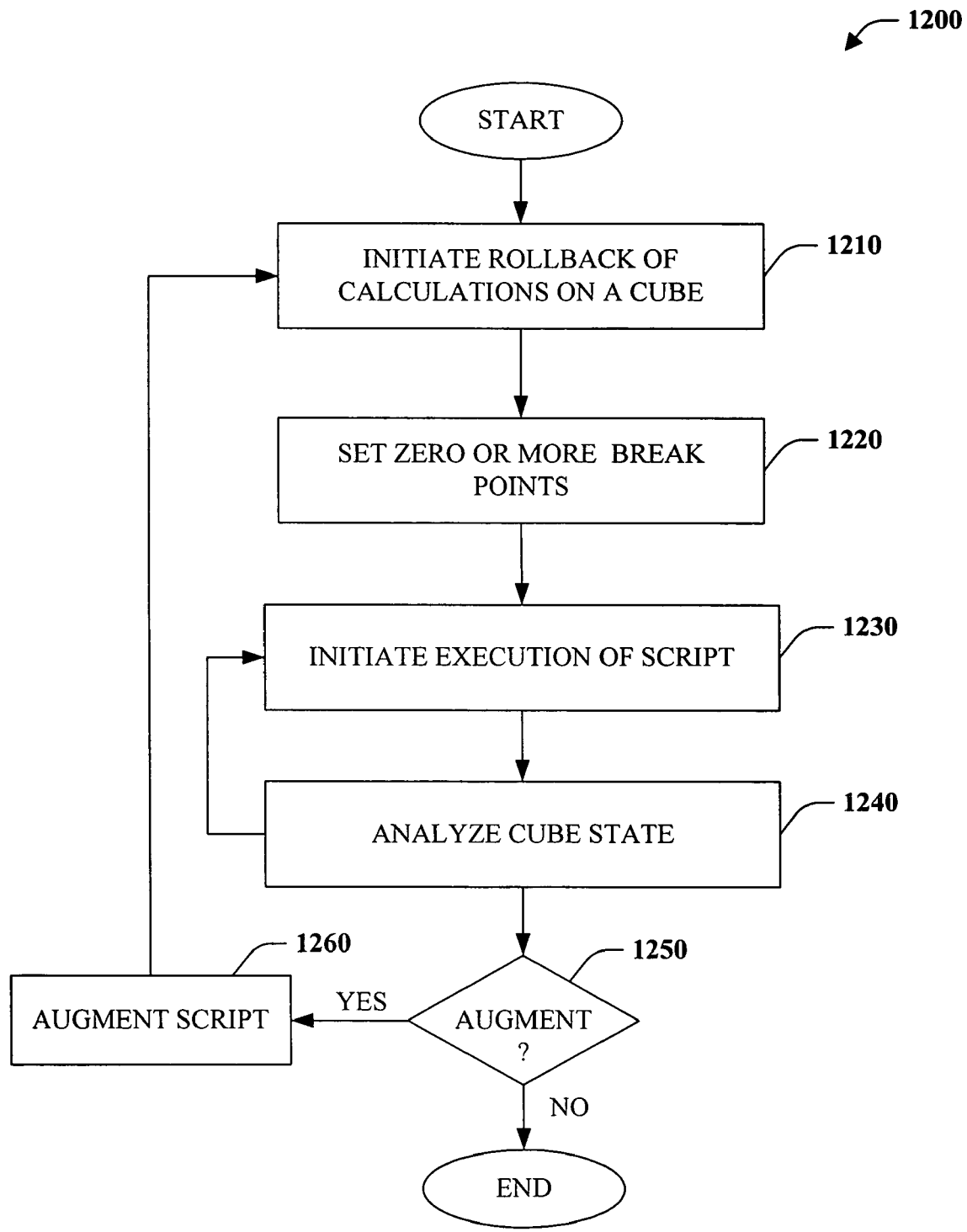
FIG. 12 is a flow chart diagram of a cube script development and/or debugging methodology in accordance with an aspect of the subject invention.
Figure 13:
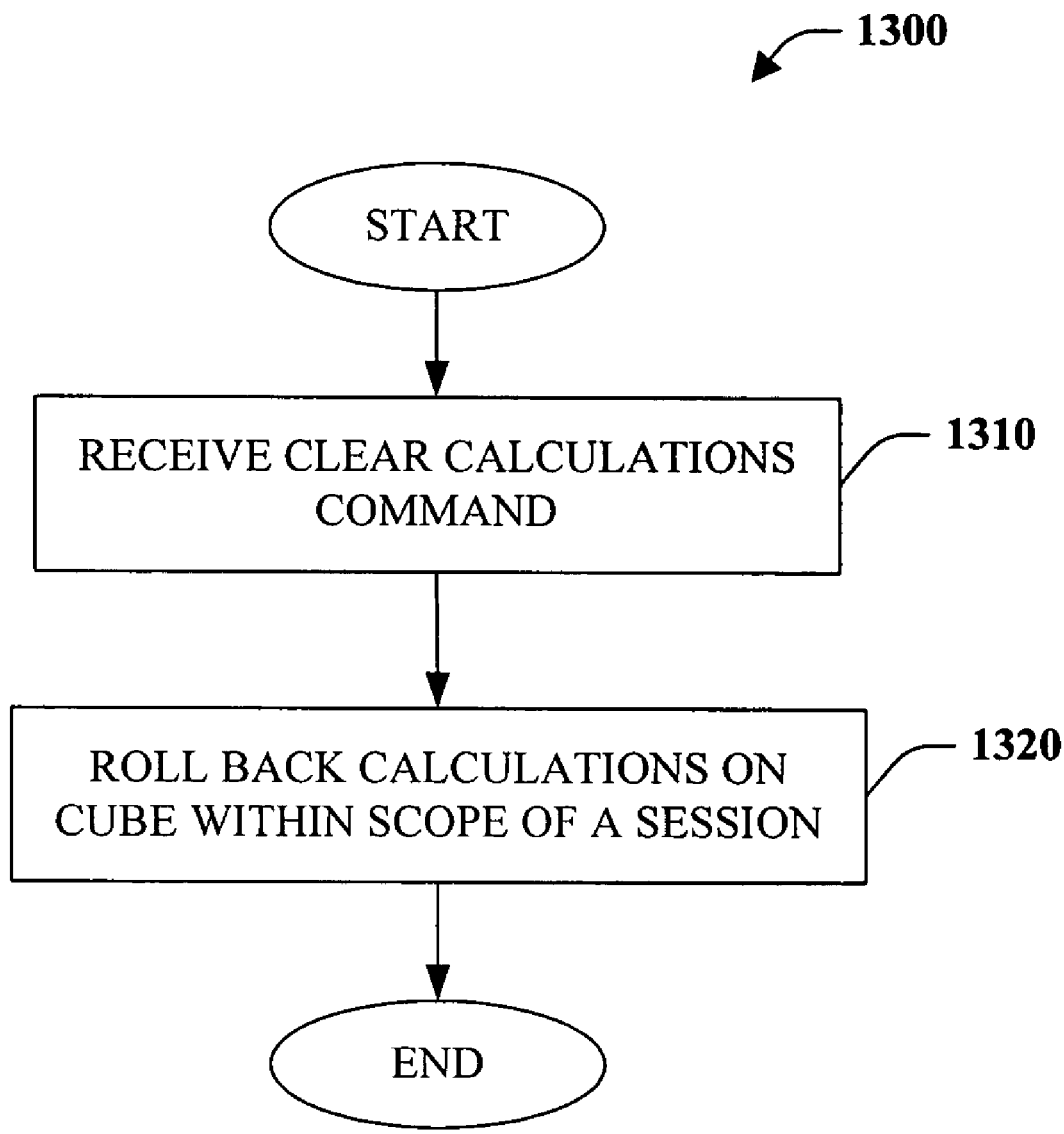
FIG. 13 is a flow chart diagram of a development and/or debugging methodology in accordance with an aspect of the subject invention.

In view of the exemplary systems described supra, methodologies that may be implemented in accordance with the present invention will be better appreciated with reference to the flow charts of FIGS. 11-13. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 11, a script development methodology 1100 is provided in accordance with an aspect of the subject invention. At 1110, calculations are cleared from a cube. Cube cells can include either data from an underlying source (i.e., fact data) or user defined formulas or expressions defining how the cell data is to be computed. Initially a data cube is empty. It can subsequently be loaded or populated with fact data. Calculations can be specified for other cells that define cell data. At 1110, such calculations are cleared or rolled back returning a cube and associated cells to the initial state prior to assignment of calculations. At 1120, a calculation script can be executed or applied. In this manner, calculations can be reapplied or assigned to cells or groups of cells one at a time. At 1130, cube data can be returned. For example, if cell C3 was initially zero and the script assigned a formula C3=C1+ C2, where C1=4 and C2=3, then the data returned would be seven as C3=7. It should be appreciated that cube data can be returned incrementally, at 1130, as calculations are applied. This enables the impact of each calculation to be assessed. Furthermore, it should be noted that the execution at 1120 can be up to a specified breakpoint and that execution can proceed incrementally from breakpoint to breakpoint. Additionally, execution with respect to breakpoints may include starting, stopping, and step over.

FIG. 12 illustrates a cube script debugging methodology 1200 in accordance with an aspect of the subject invention. At reference numeral 1210, a rollback of calculations on a cube is initiated. According to an aspect of the invention, this can correspond to specifying a script command to that affect such as an MDX Clear Calculations command or the like. At 1220, zero or more breakpoints can be set. The breakpoint allows the execution or application of the script to be halted at particular points so that the cube state can be inspected with respect to one or more applied calculations. At 1230, execution of the script is initiated. Execution will proceed until the first breakpoint, if one was set. At 1230, the cube state is analyzed. For example, a user can view the cube state and determine whether the state reflects that which was desired. After the data state is analyzed, the script execution can be initiated again to proceed to the next breakpoint, if set, or to the end. At 1240, a determination is made as to whether the script should be augmented or changed. The script may need to be changed for a myriad or reasons, for example, to make a correction if the produced state did not reflect the desired state, to add calculations, or otherwise modify the script. If the script is not going to be augmented, then the method can simply terminate. If the script is to be altered, then at 1250 the script can be augmented. For example, at 1260 changes can be made to the script presented in a script editor. The method can then proceed to reference numeral 1210, where one can initiate roll-back of cube calculations to an initial state (e.g., pass 0). It should be appreciated that prior to execution, user credentials can be specified or selected. In this manner, the debugging methodology 1200 can facilitate debugging as a named user or under a security role encompassing multiple users. It should also be noted that the methodology 1200 could be limited to a particular user session. Accordingly, one user could perform debugging of a cube while one or more other users query or otherwise interact with the same cube. Still further yet, the script can be treated as a loop thereby eliminating the need to rebuild and redeploy the script after alterations. Once a script is finalized, the script and/or changes thereto can be built and deployed on server, for example, to alter the cube for all users.

FIG. 13 a debugging methodology 1300 is depicted in accordance with an aspect of the subject invention. At reference numeral 1310, a clear calculations command is received. This command can be received from a debug application or component thereof. At 1320, calculations on a cube are rolled back for a given user session. In other words, assignments on the cube are stripped away returning the cube to its initial state, for example pass 0. At pass 0, the cube will only contain fact data and possibly writeback data that saves the previous state. The script populates post pass 0 data. Methodology 1300 can be performed by a server or more specifically a multidimensional database management system. The command clear calculation command can be received via an interface or application programming interface (API) from a debug application.

Figure 14:
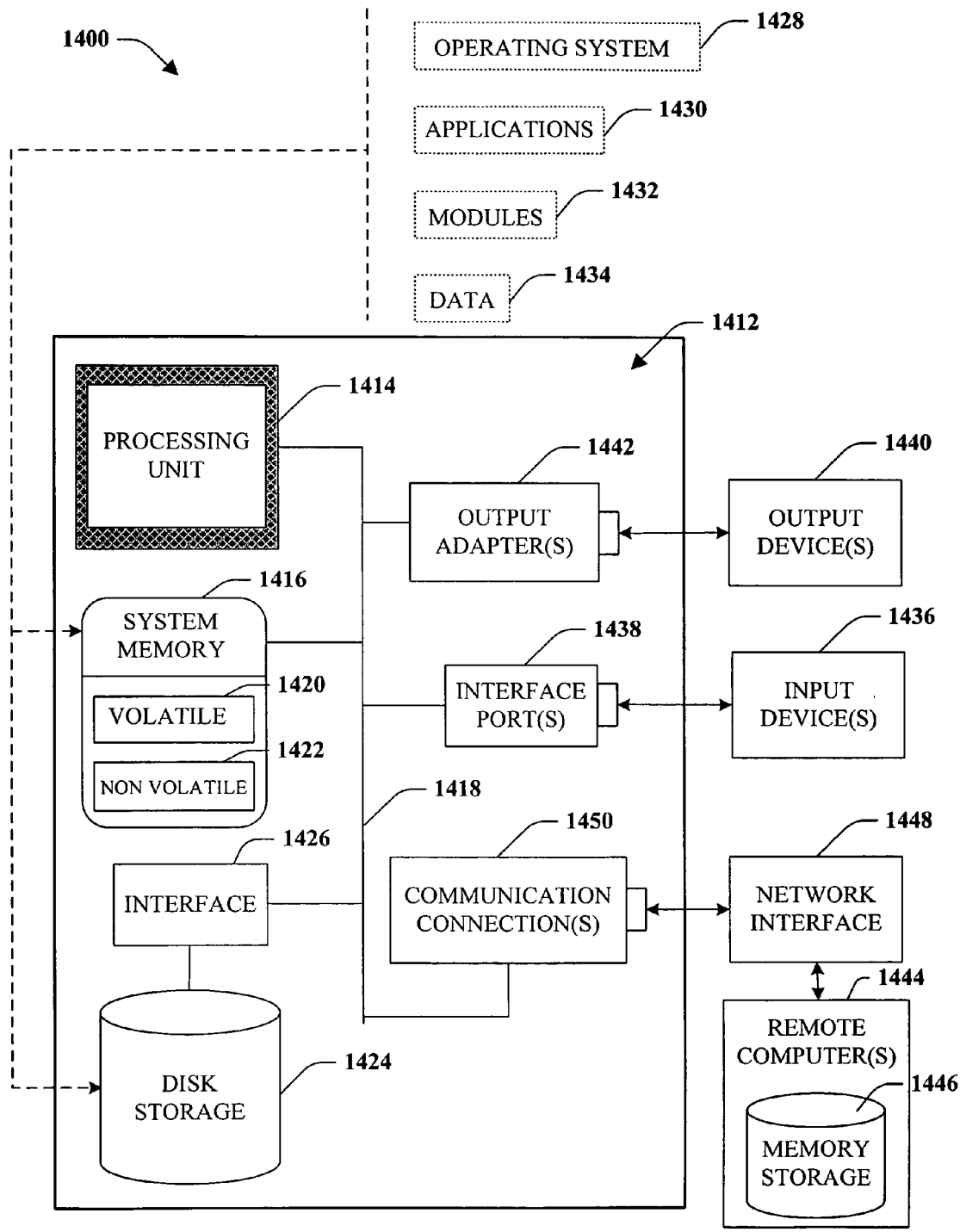
FIG. 14 is a schematic block diagram illustrating a suitable operating environment in accordance with an aspect of the present invention.
Figure 15:
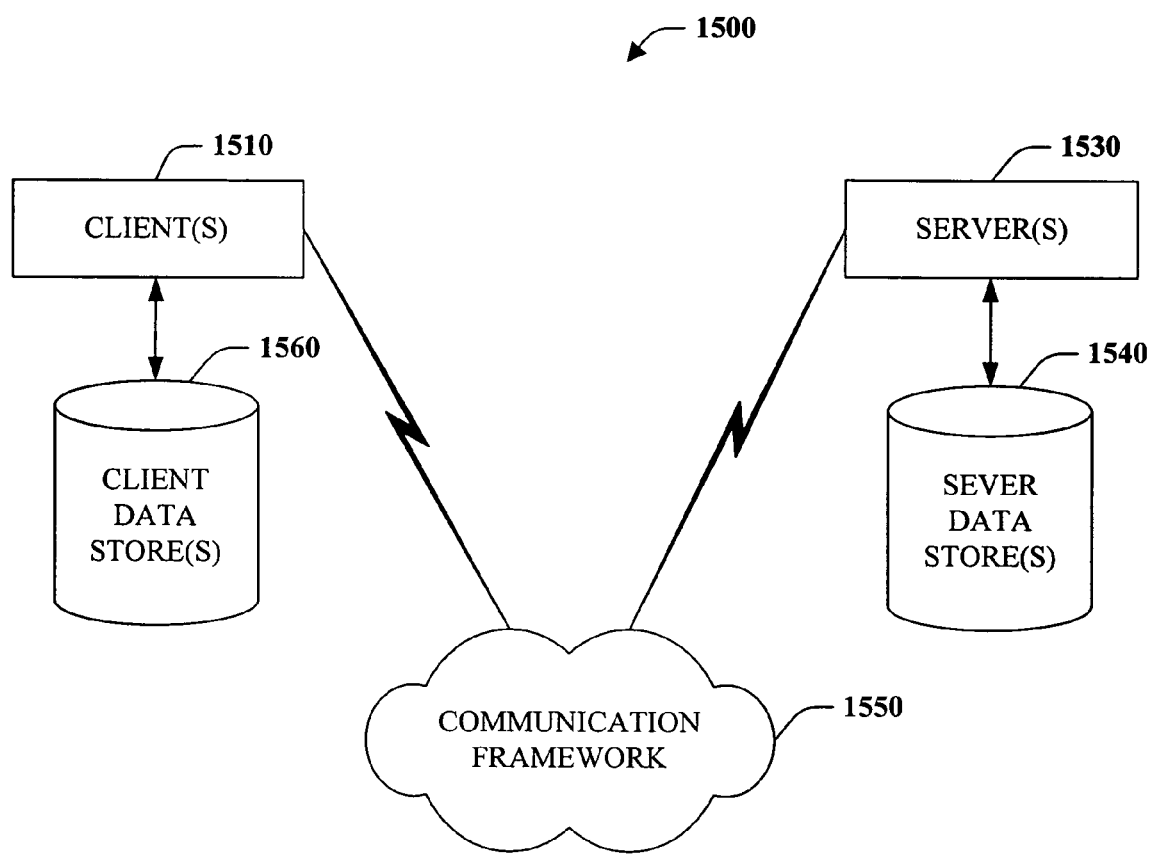
FIG. 15 is a schematic block diagram of a sample-computing environment with which the present invention can interact.

In order to provide a context for the various aspects of the invention, FIGS. 14 and 15 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1400 for implementing various aspects of the invention includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multi-processor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example disk storage 1424. Disk storage 4124 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like displays (e.g., flat panel and CRT), speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, power modems and DSL modems, ISDN adapters, and Ethernet cards.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. The server(s) 1530 can also be hardware and/or software (e.g., threads, processes, computing devices). The server(s) 1530 can house threads to perform transformations by employing the present invention, for example. One possible communication between a client 1510 and a server 1530 may be in the form of a data packet transmitted between two or more computer processes. The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A multidimensional database structure debugging system that that facilitates dynamic development and debugging of cube calculation scripts for a multidimensional database, the debugging system comprising:

a processor; and one or more physical computer readable storage media operatively coupled to the processor, the computer readable storage media having stored thereon computer executable instructions that, when executed by the processor, implement the following:

an interface component that receives user input from a user and that generates a plurality of selectable display objects that facilitate interaction between the user and the debugging system, the interface component including:

a script editor component that provides a script editor display object, the script editor component including: (1) a code component that displays a cube calculation script in the script editor display object, and that receives user input through the script editor display object to edit the cube calculation script; and (2) a break component that displays one or more script breakpoints in the script editor display object, and that receives user input through the script editor display object to set or remove one or more script breakpoints; and a browser component that provides a browser display object, the browser component including: (1) a view component that displays, in an active tab of the browser display object, cube state data, including default cube state data, that is related to at least one data cube; and (2) a query view component that receives user input through the browser display object to select at least one query, and that displays, in a query tab of the browser display object, a custom view of the cube state data corresponding to the query; and a user selection component that provides a user selection display object that receives user input through the user selection display object to select security information including at least one of a user identification, user credentials, and a security permission role for which the cube state data should be viewed; and a debug engine communicatively coupled to the interface component and the at least one data cube, wherein the debug engine:

receives user input from the interface component, including user input identifying the cube calculation script, the data cube, a script breakpoint, and the security information;

establishes a user session for the data cube that is associated with the user, and under which scope execution of the cube calculation script against the data cube is limited, enabling the debug engine to query the data cube for one or more other users while the cube calculation script is being executed against the data cube by the user;

clears cube state data associated with the data cube prior to execution of the cube calculation script, rolling back any changes previously made to the data cube;

executes script statements of the identified cube calculation script against the data cube only up to the script breakpoint and within the bounds of the security information;

outputs updated cube state data to the browser component as the script statements are executed;

receives user input from the script editor component, including user input modifying the cube calculation script and including a second script breakpoint, and in response, (1) clears cube state data associated with the data cube, (2) executes modified script statements of the modified cube calculation script against the data cube only up to the second script breakpoint, and (3) outputs updated cube state data to the browser component as the modified script statements are executed; and receives user input from the user selection component, including user input modifying the security information, and in response, executes the cube calculation script or the modified cube calculation script against the data cube in the user session within the bounds of modified security information.

2. The debugging system of claim 1, wherein the interface component further includes:

a project component that provides a project display object, the project component providing the user with assistance concerning management of a project by displaying a tree of one or more of data, files, structures, and views associated with the project in the project display object.

3. The debugging system of claim 1, wherein the interface component further includes:

an assist component that provides an information display object, the assist component including: (1) a metadata component that displays, in a first tab of the information display object, information regarding cube metadata; (2) a function component that displays, in a second tab of the information display object, functions that the user may use in the cube calculation script; and (3) a template component that displays, in a third tab of the information display object, one or more templates, structures, or patterns that may be employed to assist the user in editing the cube calculation script.

4. The debugging system of claim 3, wherein the functions include one or more of popular functions, useful functions, or functions currently specified on the data cube.

5. The debugging system of claim 1, wherein the view component further updates the default cube state data with the updated cube state data when the cube state data changes in response to execution of the cube calculation script, wherein the display of cube state data indicates any data that changed during execution of the cube calculation script.

6. The debugging system of claim 1, wherein the cube calculation script comprises a MultiDimensional expressions (MDX) script.

7. The debugging system of claim 1, wherein the debug engine steps through every cube calculation script statement or every modified cube calculation script statement, and wherein the debug engine provides updated cube state data after every statement.

8. The debugging system of claim 1, wherein the security information enables the user to impersonate another user or security role.

9. A method implemented by a computing system that includes a processor and memory storing instructions which, when executed by the processor, implement the method for facilitating dynamic development and debugging of cube calculation scripts of a multidimensional database, the method comprising:

generating a plurality of selectable display objects, including:

a script editor display object that (1) displays a cube calculation script, (2) receives user input to edit the cube calculation script, (3) displays one or more script breakpoints, and (4) receives user input to set or remove one or more script breakpoints; and a browser display object that (1) displays, in an active tab, cube state data, including default cube state data, that is related to at least one data cube; (2) receives user input to select at least one query; and (3) displays, in a query tab, a custom view of the cube state data corresponding to the query; and a user selection display object that receives user input to select security information including at least one of a user identification, user credentials, and a security permission role for which the cube state data should be viewed; and debugging the cube calculation script against the at least one data cube, the debugging including:

receiving user input from the plurality of selectable display objects identifying the cube calculation script, the data cube, a script breakpoint, and the security information;

establishing a user session for the data cube that is associated with the user, and under which scope execution of the cube calculation script against the data cube is limited, enabling one or more other users to query the data cube while the cube calculation script is being executed against the data cube by the user;

clearing cube state data associated with the data cube prior to execution of the cube calculation script, rolling back any changes previously made to the data cube;

executing script statements of the identified cube calculation script against the data cube only up to the script breakpoint and within the bounds of the security information;

displaying updated cube state data in the browser display object as the script statements are executed;

receiving user input from the script editor display object, including user input modifying the cube calculation script and including a second script breakpoint, and in response, (1) clearing cube state data associated with the data cube, (2) executing modified script statements of the modified cube calculation script against the data cube only up to the second script breakpoint, and (3) displaying updated cube state data in the browser display as the modified script statements are executed; and receiving user input from the user selection display object, including user input modifying the security information, and in response, executing the cube calculation script or the modified cube calculation script against the data cube in the user session within the bounds of modified security information.

10. The method of claim 9, wherein the interface component further includes:

a project display object that provides the user with assistance concerning management of a project by displaying a tree of one or more of data, files, structures, and views associated with the project in the project display object.

11. The method of claim 9, wherein the interface component further includes:

an information display object that displays (1) in a first tab of the information display object, information regarding cube metadata; (2) in a second tab of the information display object, functions that the user may use in the cube calculation script; and (3) in a third tab of the information display object, one or more templates, structures, or patterns that may be employed to assist the user in editing the cube calculation script.

12. The method of claim 11, wherein the functions include one or more of popular functions, useful functions, or functions currently specified on the data cube.

13. The method of claim 9, wherein the browser display object further updates the default cube state data with the updated cube state data when the cube state data changes in response to execution of the cube calculation script, wherein the display of cube state data indicates any data that changed during execution of the cube calculation script.

14. The method of claim 9, wherein the cube calculation script comprises a MultiDimensional expressions (MDX) script.

15. The method of claim 9, wherein executing includes stepping through every cube calculation script statement or every modified cube calculation script statement, and wherein the debug engine provides updated cube state data after every statement.

16. The method of claim 9, wherein the security information enables the user to impersonate another user or security role.

17. A computer program product comprising one or more physical computer readable storage media having stored thereon computer executable instructions that, when executed by a processor, perform the method of claim 9.

* * * * *